United States Patent [19]

Peterson et al.

[11] Patent Number: 5,582,094
[45] Date of Patent: Dec. 10, 1996

[54] BARBECUE GRILL

[75] Inventors: Monte L. Peterson, Barrington; James M. Fitzgerald, Schaumburg; Patrick L. Francomb, Galena, all of Ill.; Greg Breiding, Columbus, Ohio; Mark Ciesko, Westerville, Ohio; Andreas Roessner, Columbus, Ohio; Dale Peacock, Freeport, Ill.

[73] Assignee: The Thermos Company, Freeport, Ill.

[21] Appl. No.: 501,487

[22] Filed: Jul. 12, 1995

Related U.S. Application Data

[63] Continuation of Ser. No. 953,644, Sep. 29, 1992, abandoned.

[51] Int. Cl.[6] ............................................. A47J 37/07
[52] U.S. Cl. ........................... 99/445; 99/425; 99/446; 99/450; 126/25 R; 126/50; 126/304 A; 219/443; 219/455; 219/457; 280/763.1
[58] Field of Search ................. 99/422, 425, 444–446, 99/450; 126/25 R, 30, 50, 304 R, 304 A, 305; 280/47.33, 763.1; 188/5; 219/443, 455, 457; 220/425

[56] References Cited

U.S. PATENT DOCUMENTS

| | | | |
|---|---|---|---|
| 1,033,398 | 7/1912 | Heylandt | 220/425 |
| 1,090,924 | 3/1914 | Lawrence | 99/445 |
| 1,246,622 | 11/1917 | Lightfoot | 99/422 |
| 1,504,097 | 8/1924 | Carpenter | 220/425 |
| 1,614,661 | 1/1927 | Detwiler | 99/446 |
| 1,690,570 | 11/1928 | Dalbey, Sr. | 99/425 |
| 1,802,005 | 4/1931 | Detwiler | 99/446 |
| 2,290,658 | 7/1942 | Volks | 99/446 |
| 2,538,524 | 1/1951 | Joseph | 220/425 |
| 2,780,474 | 2/1957 | Farah et al. | 126/304 A |
| 2,787,995 | 4/1957 | Alter | 126/25 R |
| 3,002,444 | 10/1961 | Hoebing . | |
| 3,010,383 | 11/1961 | Greene | 99/446 |
| 3,044,577 | 7/1962 | Lotz | 188/5 |
| 3,227,067 | 1/1966 | Klemm | 99/446 |
| 3,343,527 | 9/1967 | Manteris | 126/25 R |
| 3,385,282 | 5/1968 | Lloyd . | |
| 3,527,154 | 9/1970 | Sharper et al. | 99/446 |
| 3,623,422 | 11/1971 | Marshall | 99/400 |
| 3,848,110 | 11/1974 | Giguere et al. | 219/443 |
| 3,938,431 | 2/1976 | Potvin | 99/425 |
| 3,959,620 | 5/1976 | Stephen, Jr. | 99/446 |
| 3,963,898 | 6/1976 | Tuckwell . | |
| 4,307,659 | 12/1981 | Martin et al. | 99/444 |
| 4,434,781 | 3/1984 | Koziol | 126/25 R |
| 4,508,024 | 4/1985 | Perkins | 99/446 |
| 4,878,477 | 11/1989 | McLane | 126/41 R |
| 4,917,006 | 4/1990 | Bowen et al. | 99/331 |
| 5,009,151 | 4/1991 | Hungerford | 99/445 |
| 5,035,445 | 7/1991 | Poulin | 280/763.1 |
| 5,105,725 | 4/1992 | Haglund | 99/446 |

OTHER PUBLICATIONS

1986 Sunbeam Leisure Products Company catalog showing cooking grids.

*Primary Examiner*—Mark Spisich
*Attorney, Agent, or Firm*—Schiff Hardin & Waite

[57] ABSTRACT

An energy-efficient barbecue grill includes an insulated top for retaining heat within the cooking area and a drain to remove grease from the cooking surface of the grill. A preferred embodiment of the grill is provided with an electric heat source.

16 Claims, 7 Drawing Sheets

BARBECUE GRILL

This is a continuation of application Ser. No. 07/953,644 filed on Sep. 29, 1992 now abandoned.

BACKGROUND OF THE INVENTION

This invention relates generally to barbecue grills, and more particularly relates to barbecue grills of relatively great energy efficiency.

Barbecue grills have been used for many years by backyard cooking enthusiasts. Typically the heat necessary to barbecue meat and other foods in medium or large grills is generated by burning charcoal briquets. These charcoal grills satisfactorily generate heat, but undesirable side effects can occur. For example, briquette lighter fluid is sometimes used to ignite charcoal briquets, and the flames generated may be dangerous in small enclosures such as porches or balconies. For this reason, apartment buildings or condominiums often ban the use of charcoal grills on porches or balconies. In addition, the hot briquettes cannot always be cooled quickly and so it may be impossible to put away or leave a briquette grill immediately after a barbecue. Furthermore, disposing of briquette ash can be troublesome and messy.

Natural gas and propane barbecues provide added convenience over the charcoal grill in that new charcoal is not required for each use. Furthermore, a gas grill is ignited without the use of lighter fluid. But the gas fuel is supplied in discrete tanks, and so the grill user must refill the tank or acquire a replacement tank occasionally.

Electric grills have been used in an attempt to overcome the shortcomings of charcoal and gas grills. Electric grills use electricity to generate heat, and electricity is an inexpensive and plentiful source of energy which does not necessitate a trip to the store to purchase charcoal or to have the tank refilled with gas. However, to generate sufficient heat and temperatures with which to cook, presently available electric grills typically have large power demands. For even medium-sized electric barbecue grills, the amount of current required can approach the typical maximum current ratings for household wall outlets. If, however, the power requirements of the grill are reduced, then grills of large or even medium size may not be able to generate sufficient cooking heat or temperatures.

It is an object of this invention to provide an electric grill of a size sufficient to cook several steaks at once and yet which will provide sufficient cooking heat and temperatures from a typical household electric circuit. It is a further object of this invention to provide an energy-efficient cooking grill that requires less energy to generate sufficient cooking heat than has been required by prior electric grills.

Charcoal and gas grills often provide a grate upon which to cook food. This grate enables grease to escape from the underside of the food so that the food is barbecued and does not fry in its own grease. Many conventional electric grills provide a plate-like cooking surface from which grease does not drain so that the food ends up frying in the grease. It is therefore another object of the present invention to provide means for raising the food above the collecting grease and for draining grease from the cooking surface.

Charcoal grills are often desired for the charcoal flavor they impart to the cooked food. In general, electric grills are not able to provide this charcoal flavor. It is therefore another object of the present invention to provide an electric cooking grill that provides the barbecued flavoring of foods cooked on a charcoal grill.

Other objects and advantages of the invention will become apparent to those skilled in the art by reference to the accompanying drawings. Throughout the drawings, like reference numerals refer to like parts.

SUMMARY OF THE INVENTION

The present invention relates to a barbecue grill comprising an upper grill housing having an inner and outer shell, and the shells are sealed to form an enclosed insulating space. In a preferred embodiment, the cooking surface of the grill comprises ridges and troughs, and the troughs define beveled holes which allow grease to escape from the cooking surface. The cooking surface of the preferred embodiment includes a non-stick coating that is able to withstand repeated heating, a heating means integral with the cooking surface, and means for providing a smoked flavor to the food. The grill also preferably includes a brace connected to the legs of the grill to provide additional structural support. Each of the legs preferably includes casters to allow the grill to roll, and the casters also include brake means to prevent the casters and grill from rolling when stability is desired. Another embodiment of the grill includes kick-stand bars to enhance grill stability.

DESCRIPTION OF THE PREFERRED EMBODIMENTS

While the invention will be described in connection with several preferred embodiments, it will be understood that it is not intended to limit the invention to these embodiments. On the contrary, it is intended to cover all alternatives, modifications and equivalents as may be included within the spirit and scope of the invention as defined by the appended claims.

Figure 3:
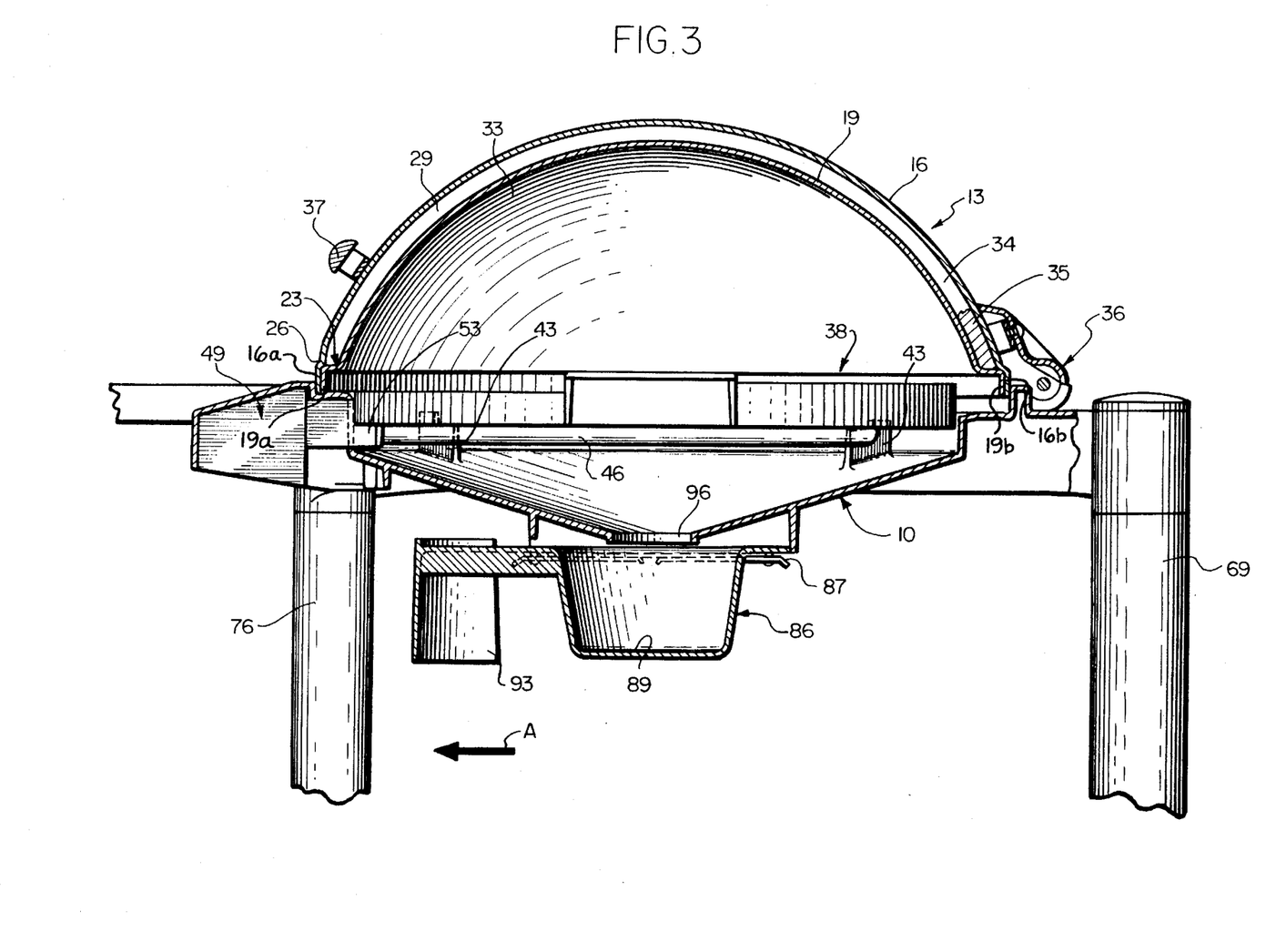
FIG. 3 is a partial sectional view of the barbecue grill of FIG. 1 taken substantially in the planes of Line 3—3 in FIG. 2.
Figures 4, 5, 6:
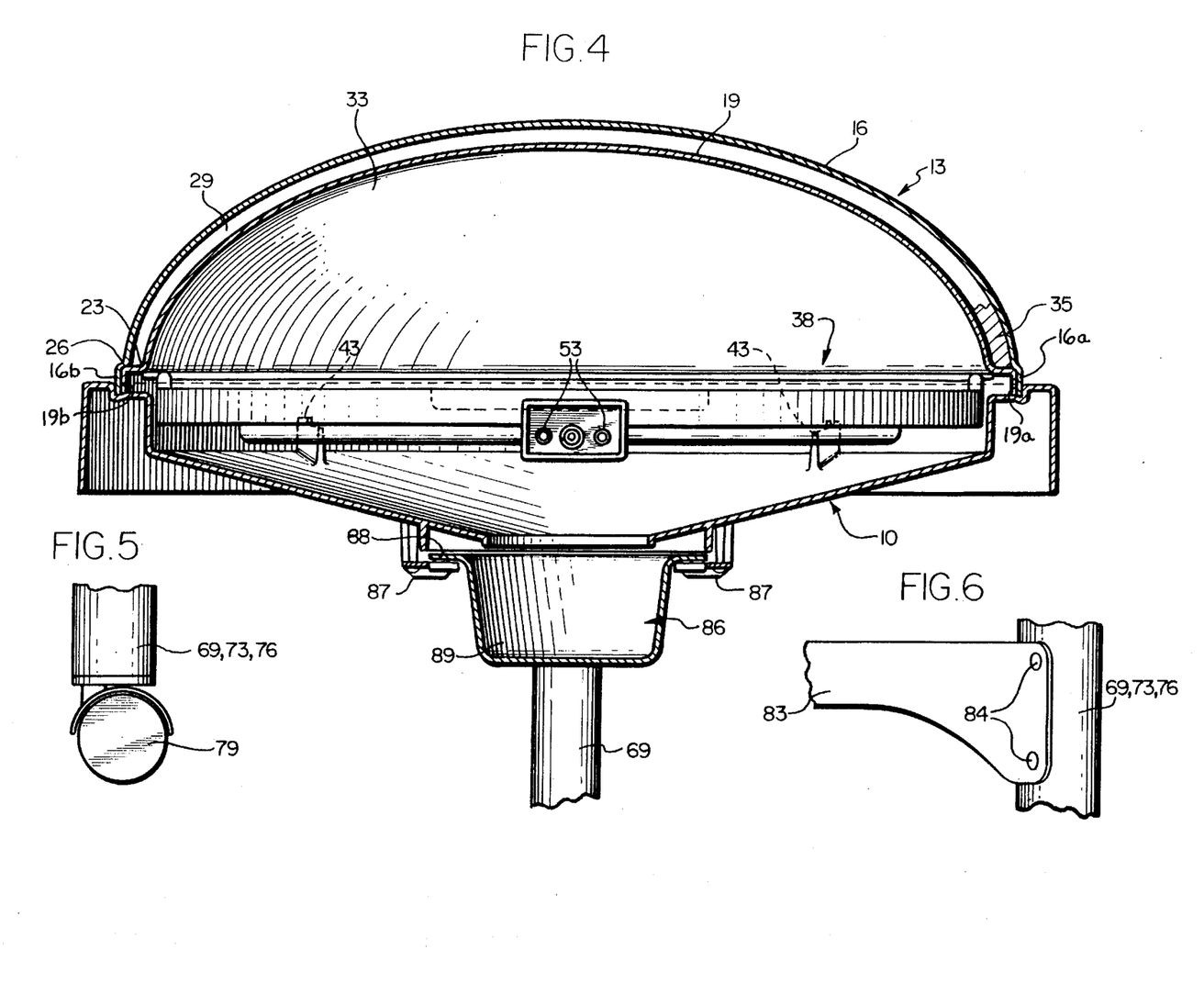
FIG. 4 is a partial sectional view of the barbecue grill of FIG. 1 taken substantially in the plane of Line 4—4 in FIG. 2.
FIG. 5 is a fragmentary view of a caster and associated leg of a preferred embodiment of the grill shown in FIG. 1.
FIG. 6 is a fragmentary view of the support connected to a leg of a preferred embodiment of the grill shown in FIG. 1.

Referring to FIGS. 1–4, the preferred embodiment of the barbecue grill includes a lower grill housing 10, and an upper grill housing 13 comprised of an outer shell 16 and an inner shell 19. The rim 23 of the inner shell 19 and rim 26 of the outer shell 16 are sealed to form an enclosed space 29 between the shells. More specifically, the outer shell 16 and inner shell 19 each have a lower flange 16(a), 19(a) respectively, which are disposed and dimensioned to engage the other flange in a substantially airtight engagement along an uninterrupted, endless path as shown in FIGS. 3 and 4. As also shown there, this path is located not substantially higher than the cooking surface 38; that is, the path is at substantially the same level as the cooking surface. The engaged flanges 16(a), 19(a) each have a lower end 16(b), 19(b) engaged to the other flange end. These flange ends contact the lower housing 10 along an a substantially continuous path for inhibiting air, gas and thermal movement between the cooking spaces and a surrounding environment. Those skilled in the art will understand that as a standard grill heats up, a significant amount of heat can escape from the grill by conduction through the grill housing surfaces, especially the top surfaces, to the outside environment. In accordance with the present invention, the grill interior 33 is insulated from the outside environment by drawing a vacuum within the enclosed space 29. The vacuum acts as a heat transfer barrier between the interior or cooking area 33 and the outside environment and thereby insulates the cooking area. Consequently, less energy is required to attain proper cooking heats and temperatures. If desired, a getter substance 34 can be included to capture oxygen and other atmospheric gases which may leak into the space 29 between the shells 16 and 19.

In an alternative embodiment, no vacuum is provided in the enclosed space 29. The space 29 itself nevertheless provides insulation to reduce heat transfer from the cooking area to the outside environment.

In yet another embodiment, the space 29 is completely or partly filled with an insulating material 35 such as high temperate mechanically bonded glass or ceramic fiber insulation. Material known as Burglass 1200 offered by the Burlington Glass Factory, 1345 Avenue of the Americas, New York, N.Y. 10105 can be used. Alternatively, high temperature mechanically bonded ceramic fiber insulation known as Cer-Wool LT offered by Premier Refractories & Chemicals, 901 East Eighth Avenue, King of Prussia, Pa. 19406 can be employed.

The preferred embodiment illustrated in the drawings shows the use of an electric heating element to produce the necessary heat for cooking. The insulated upper grill housing 13 is not, however, limited solely to use with an electric barbecue grill. As can be appreciated, an insulated upper grill housing 13 can also be used on grills using other sources of energy to produce heat so as to reduce the amount of energy necessary to develop the requisite heat and temperature for cooking. For example, using the insulated upper housing 13 on a gas grill would reduce the gas consumption of the grill because the heat loss to the environment through the upper grill housing 13 will be substantially reduced.

As shown in FIG. 3, the upper grill housing 13 is preferably attached to the lower housing 10 by a hinge mechanism 36. Thus, when the upper housing is lifted by means of the handle 37, the upper housing will rotate about the hinge mechanism into an over-center but substantially upright vertical position (not shown in the figure). The upper housing 13 is slidably removable from the hinge mechanism 36 so that the upper housing 13 can be completely separated from the grill to allow for cleaning of the grill or for storage.

The cooking surface 38 is shown in FIG. 3 and FIG. 4 resting on a series of legs 43 affixed in the lower housing 10. The heating element 46 is integral with the cooking surface 38, and is integrally located and encased in the surface or plate bottom to provide optimum heat transfer. The heating element 46 is connected through heating element connectors 53 to grill thermostatic controls 49 so as to receive current from a common household circuit.

This combination of insulated upper grill housing 13 and electrically heated cooking surface provides a grill of relatively high energy efficiency, in accordance with the invention. For example, the cooking surface 38 can be sized to have 225 square inches of area, and the integral heating element 46 can be adapted to receive 1500 watts of power at 115 volts A.C. The surface will generate about 5121 BTUs, or about 22.76 BTUs per square inch. A cooking temperature at the cooking surface of 600° F. can be maintained. Arithmetic calculations show that 600° F./1500 watts or 0.4° F. per watt of power is generated, and 600° F./225 square inches or 2.67° F. per square inch of cooking surface is provided.

Figure 7:
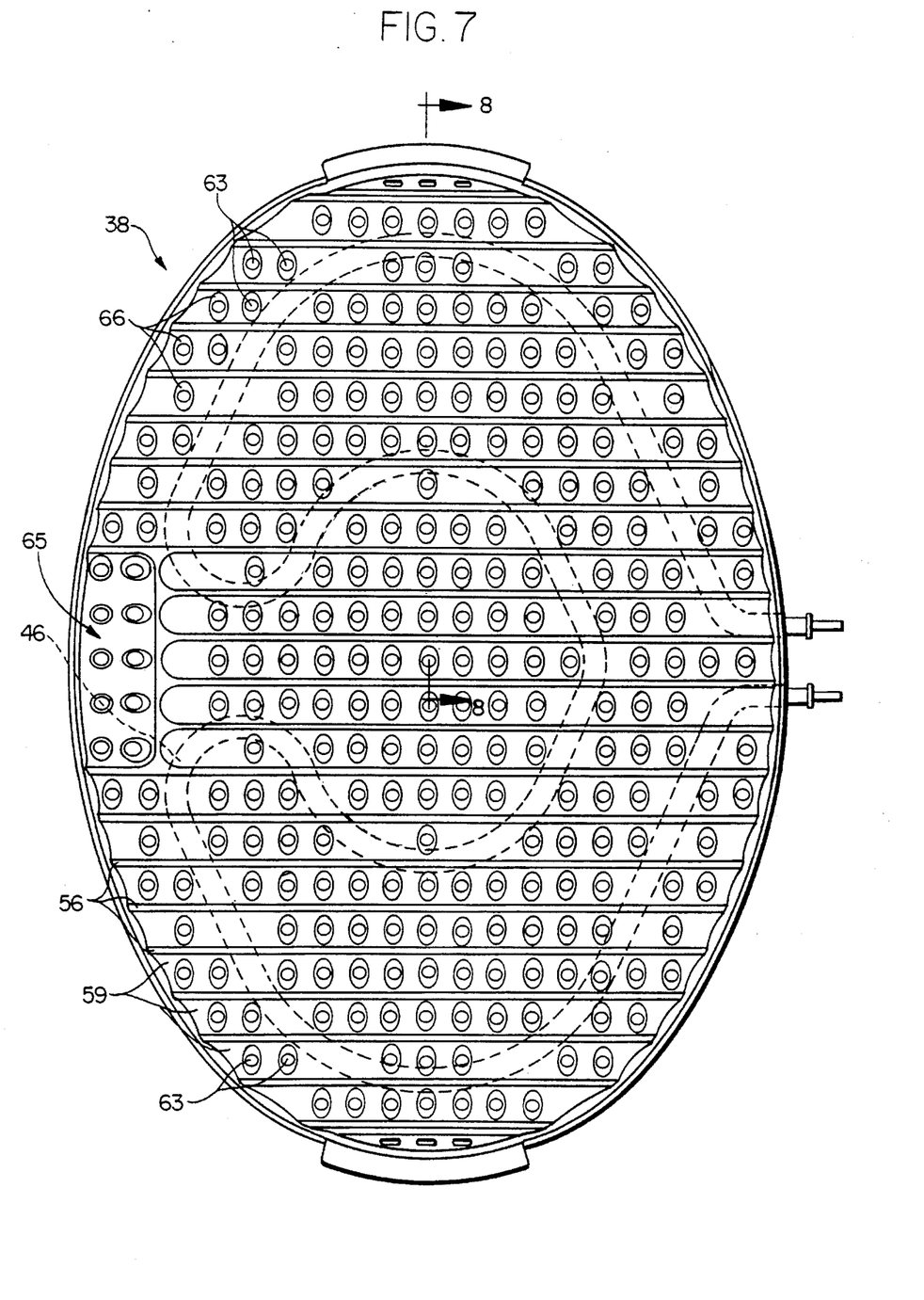
FIG. 7 is a top plan view of the cooking surface of a preferred embodiment of the grill shown in FIG. 1.
Figure 8:
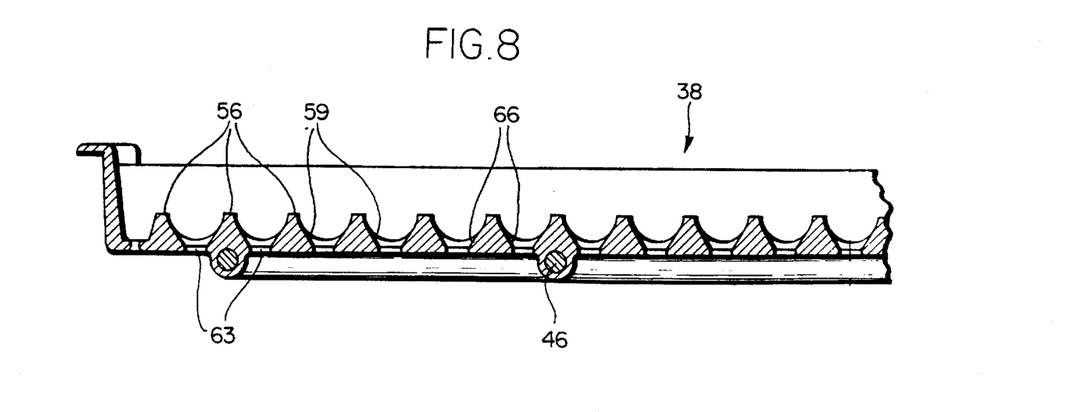
FIG. 8 is a partial sectional view of the cooking surface taken substantially in the plane of Line 8—8 in FIG. 7.

The cooking surface 38 is shown more clearly in FIG. 7 and in a partial cross-sectional view in FIG. 8. FIG. 8 shows the heating element 46 incorporated in the structure of the cooking surface 38. The cooking surface 38 includes parallel ridges 56 and generally semi-circular, U-shaped troughs 59 extending between adjacent ridges 56. Within the troughs 59 are holes 63 that extend from the top of the cooking surface entirely through the cooking surface as shown in FIG. 8. In accordance with another aspect of the invention, these holes 63 permit grease that is collecting in the troughs 59 to drain through the holes and drip into the lower housing 10 without producing excessive smoke. As shown in FIG. 7, the troughs holes 63 are located so as to not expose the heating element 46. It can be appreciated that if the holes were placed directly above the heating element, there would be a significant risk of fire from the grease dripping on, and being ignited by, the heating element. Instead, the design of this cooking grid or surface 38 produces no flare-ups, yet provides desired smoke and aroma to the food. In accordance with this aspect of the invention, the ridges 56 support the cooking food and the troughs 59 and holes permit grease to drain away while still allowing proper smoking and caramelizing. A small receptacle 65 formed in and on the cooking surface 38 can be provided to hold mesquite wood chips or other flavoring substances.

To further promote grease to drain from the cooking surface 38 through the holes 63, each of the holes include a beveled edge 66 extending axially outward from the perimeter of the hole and sloping toward the center of the hole. These beveled edges 66 effectively increase the area of the holes by creating a larger surface area within the trough in which gravity will cause the grease to flow toward and drip through the hole 63.

Figure 1:
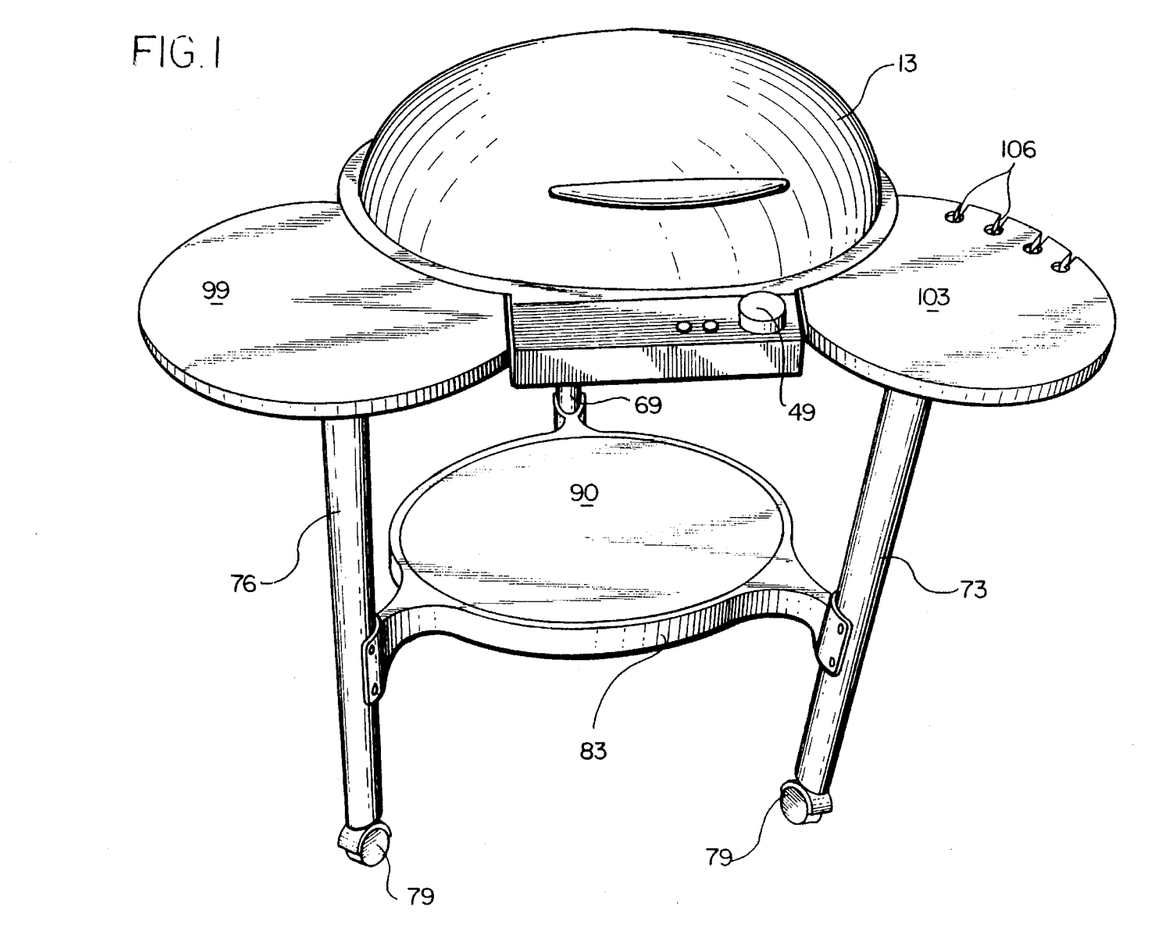
FIG. 1 is a perspective view of a preferred embodiment of the present barbecue grill invention.
Figure 2:
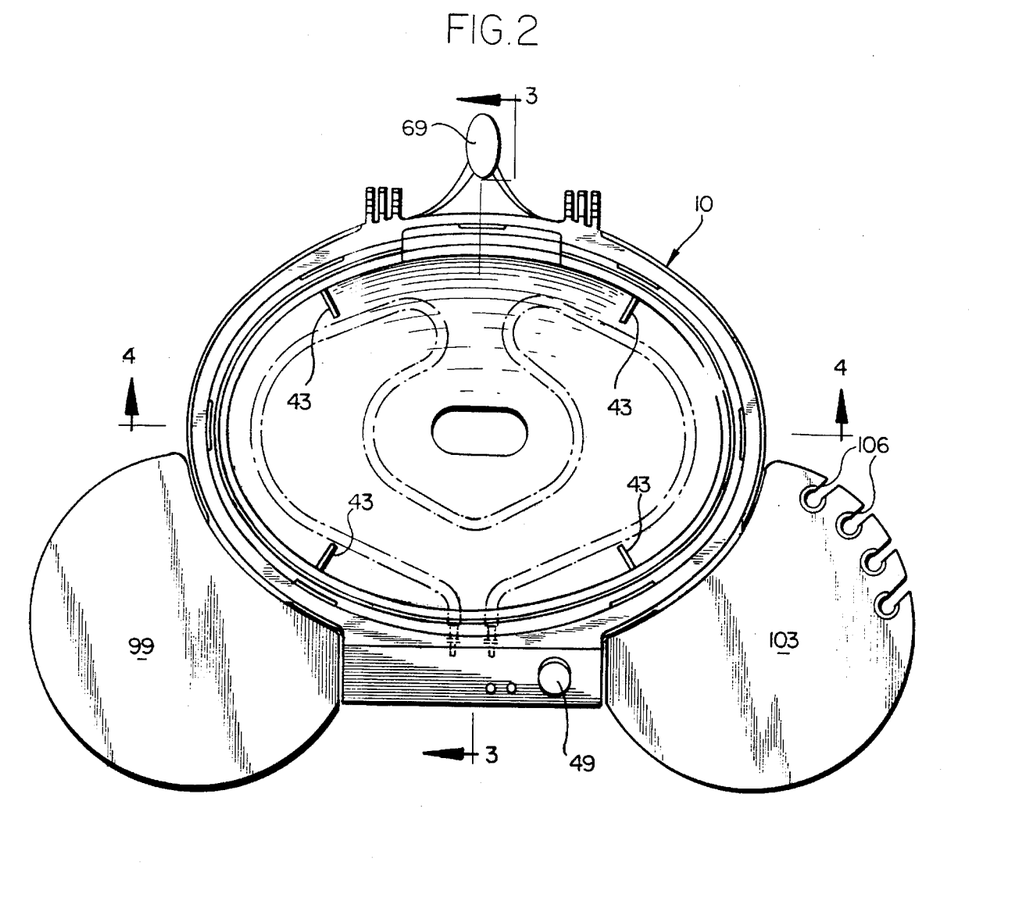
FIG. 2 is a top plan view of the barbecue grill of FIG. 1, the lid having been removed for purposes of clarity.

As shown in FIG. 1, the preferred embodiment includes three support legs 69, 73, 76, which are attached to the lower grill housing 10. Two of the legs are shown in the partial cross-sectional view of FIG. 3. Attached to the lower end of each of the legs (the end opposing the lower grill housing 10) are casters 79. As an example, FIG. 5 shows a leg 73 with an attached caster 79. The casters 79 provide a sturdy support for the grill, and also allow the grill to be rolled from one location to another without having to lift the grill. To prevent the grill from rolling down an incline or otherwise moving, brakes 80 (FIG. 9) are fitted to the casters 79 to lock the caster wheel and prevent it from rolling.

As also shown in FIG. 1, a brace means 83 is attached to each of the legs 69, 73, 76 at a point between the leg ends. The brace means 83 provides additional structural support to the barbecue grill by ensuring that the lower portions of the legs remain rigid and remain spaced at a desired distance from one another. FIG. 6 illustrates the attachment of the brace means 83 to a leg (for example, leg 73) in the preferred embodiment. The brace 83 is attached by two bolts 84 to each leg. The vertical spacing of the bolts provides desired unit rigidity. A table 90 can be provided within the brace 83 to further stabilize the grill and to provide a convenient storage location.

Figure 9:
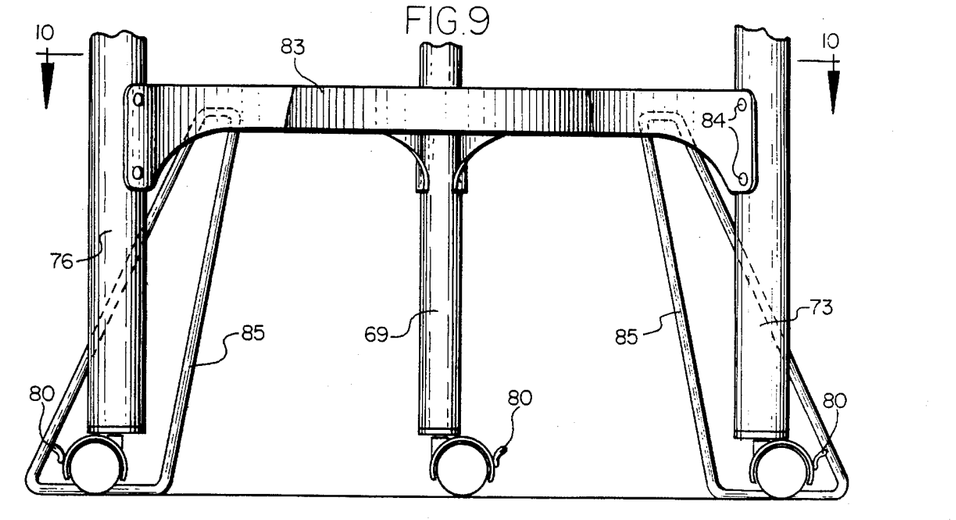
FIG. 9 is a fragmentary elevational view of an alternate embodiment of the lower structure of the grill, the grill structure including kick-stand type bars to enhance grill stability.
Figure 10:
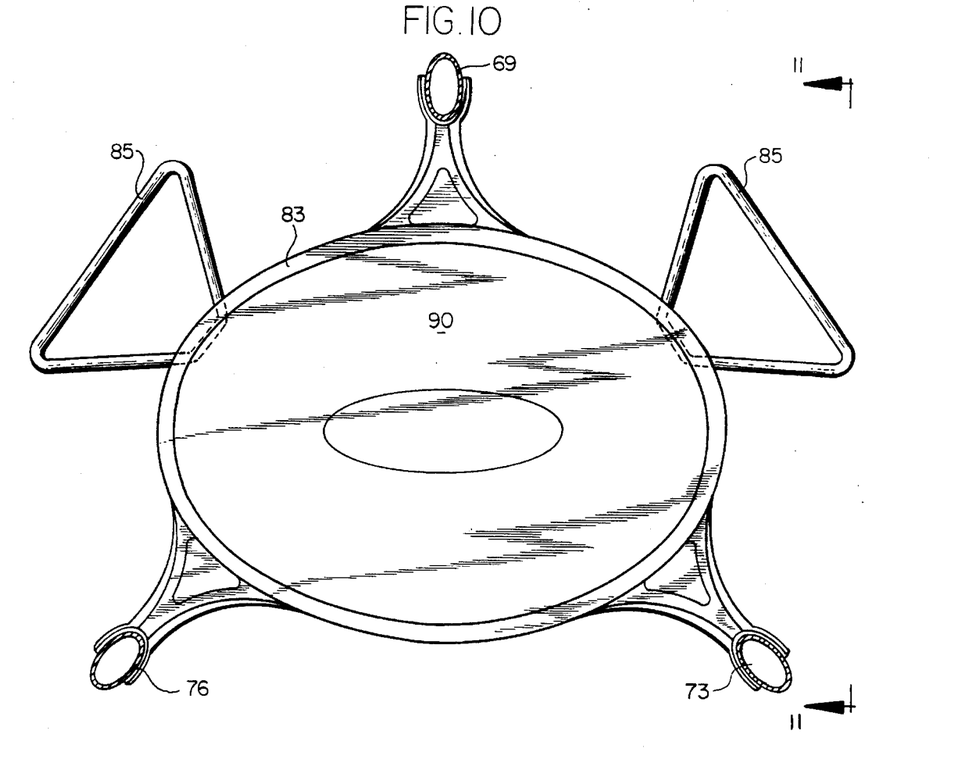
FIG. 10 is a sectional plan view taken substantially in the plane of line 10—10 in FIG. 9.
Figure 11:
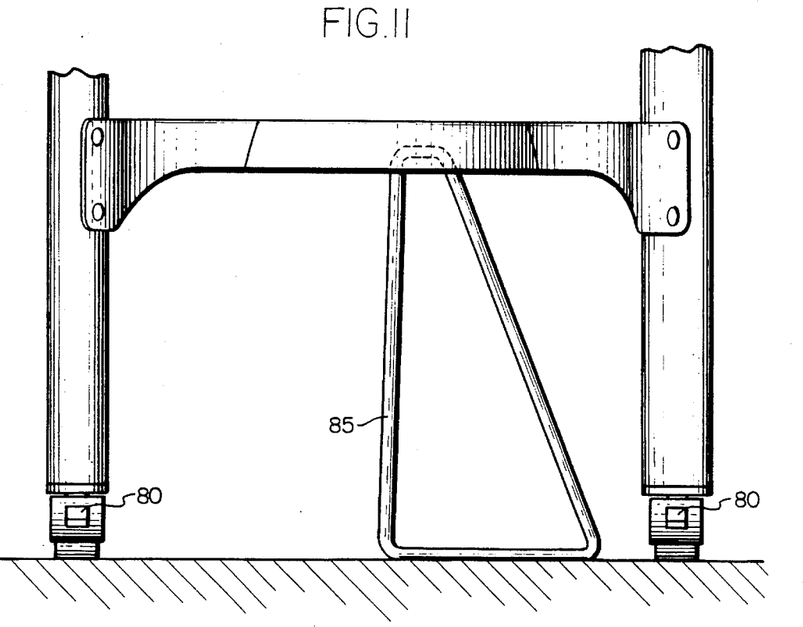
FIG. 11 is a developed elevational view taken substantially in the plane of line 11—11 in FIG. 10.
Figures 12, 13, 14:
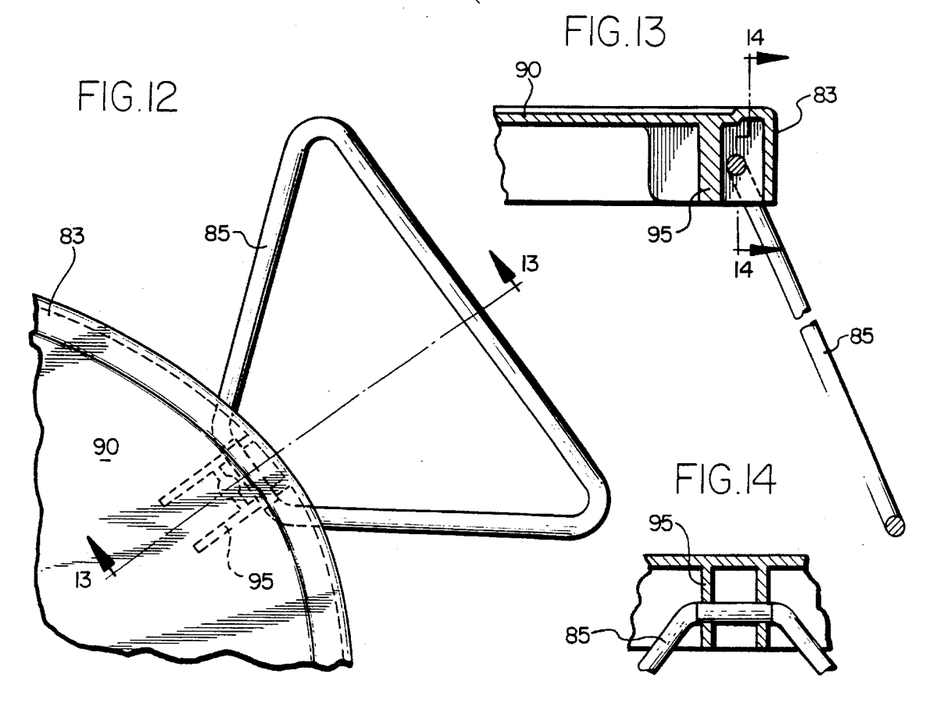
FIG. 12 is a fragmentary plan view similar to FIG. 10 and showing in greater detail the structure attaching the kickstand to the grill table.
FIG. 13 is a sectional view taken substantially in the plane of line 13—13 in FIG. 12.
FIG. 14 is a sectional view taken substantially in the plane of line 14—14 in FIG. 13.

As shown in FIGS. 9–14, stabilizer bars 85 of the kick-stand type can be appended to the brace 83 and table 90. These two kick-stands are located at the rear of the grill between the legs 69 and 73, and between the legs 69 and 76 as illustrated in FIGS. 9 and 10 so as to provide unimpeded access to the grill front. An H-shaped brace 95 pivotally attaches each bar 85 to the grill, so that the distal ends of the bars 85 can be pivoted up to permit grill movement or pivotal down into ground engagement as shown to impede unwanted grill movement and enhance grill stability. Because the stabilizer bars 85 are mounted at angles to one another, grill stability and motion impedance are provided in several directions.

As shown in FIG. 3 and FIG. 4, a grease-catching cup 86 is slidably and removably engaged with the lower grill housing 10 by rails 87. The grease-catching cup 86 includes a lip 88 around the periphery of the cup to slide into and engage with the rails 87 and thus support the grease-catching cup in position as shown in the figures. The grease cup 86 is provided with a grease-catching receptacle 89 in which grease collects, and a handle 93 for removing the grease cup by sliding the grease cup in the direction indicated by arrow A in FIG. 3. Because the preferred embodiment of the grill includes a lower housing 10 that is bowl-shaped (as shown in FIG. 3), grease that drips through the holes 63 of the cooking surface 38 and falls on the lower housing 10 will tend to flow down the sloped sides of the lower housing to the lowest portion, or bottom, of the bowl-shaped lower housing. At that point, the lower housing forms a cutout 96 to allow grease to flow from the lower housing into the grease-catching cup 86, in accordance with another aspect of the invention.

The preferred embodiment of the present invention is also provided with outboard food support trays 99, 103, and utensil holding means 106. Here the holders 106 take the form of slotted cutouts.

We claim:

1. An energy-efficient grill, comprising in combination:
   a lower grill housing;
   at least three legs for supporting said lower grill housing;
   a cooking surface, removably mounted on said lower grill housing; and
   an upper grill housing engaged with said lower grill housing, thereby forming a cooking space enclosed by said upper grill housing and said lower grill housing, the upper grill housing including an outer shell; and
   an inner shell having smaller dimensions than said outer shell, said inner shell being sealed to said outer shell along an uninterrupted, endless path at the edges of the shells to form an enclosed space between said inner and outer shells for thermally insulating the cooking space from a surrounding environment, the inner shell and the outer shell each having a lower shell flange disposed and dimensioned to engage the flange of the other said shell in a substantially airtight engagement along said path, the path being located at substantially the same level as the cooking surface, the engaged flanges each having a lower flange end that are mutually connected and that engage the lower housing along a substantially continuous path for inhibiting air, gas and thermal movement between the cooking space and the surrounding environment.

2. A grill according to claim 1 wherein said cooking surface further comprises a non-stick coating resistant to food sticking to said surface, and wherein said coating can withstand repeated high temperature cooking.

3. A grill according to claim 1, further comprising insulating means enclosed within said space between said inner and outer shell for insulating the cooking space to prevent excessive heat loss from said cooking surface.

4. A grill according to claim 3, wherein said insulating means further comprises a vacuum.

5. A grill according to claim 3 wherein said insulating means includes insulating material.

6. A grill according to claim 4, including gas removing getter means located between said inner and said outer shells.

7. A grill according to claim 1 wherein said cooking surface further comprises:
   heating means integral with said cooking surface;
   said cooking surface having an upper and lower surface, wherein said upper surface comprises a plurality of ridges; and
   a plurality of troughs in said upper surface, wherein each of said troughs has a generally smooth U-shaped surface and extends parallel to said ridges and lies between pairs of adjacent ridges.

8. A grill according to claim 7 wherein said cooking surface further includes a receptacle on said upper surface of said cooking surface for holding flavoring substances.

9. A grill according to claim 7 wherein said cooking surface defines a plurality of ovoid holes extending from the bottoms of the troughs defined by said upper surface to said lower surface for draining grease collecting in said troughs.

10. A grill according to claim 9 wherein each of said holes further comprise a bevelled portion on a portion of said hole that communicates with said upper surface.

11. A grill according to claim 1 further comprising ground contacting casters, each caster being attached to an end of a respective one of the legs opposing said lower housing.

12. A grill according to claim 1 further comprising a brace, said brace being attached to each of said legs at a point between the opposing ends of said legs.

13. A grill according to claim 1 further including at least one stabilizer bar attached to the grill and adapted to engage the ground for impeding unwanted grill movement and enhancing grill stability.

14. A grill according to claim 12 further including at least one stabilizer bar attached to the grill brace at a point between adjacent grill legs and adapted to engage the ground for impeding unwanted grill movement and enhancing grill stability.

15. A grill according to claim 1 wherein said lower housing is bowl-shaped.

16. A grill according to claim 15 further comprising grease-catching means slidably engaged with said lower housing for catching grease produced by cooking.

\* \* \* \* \*